Figure 1:
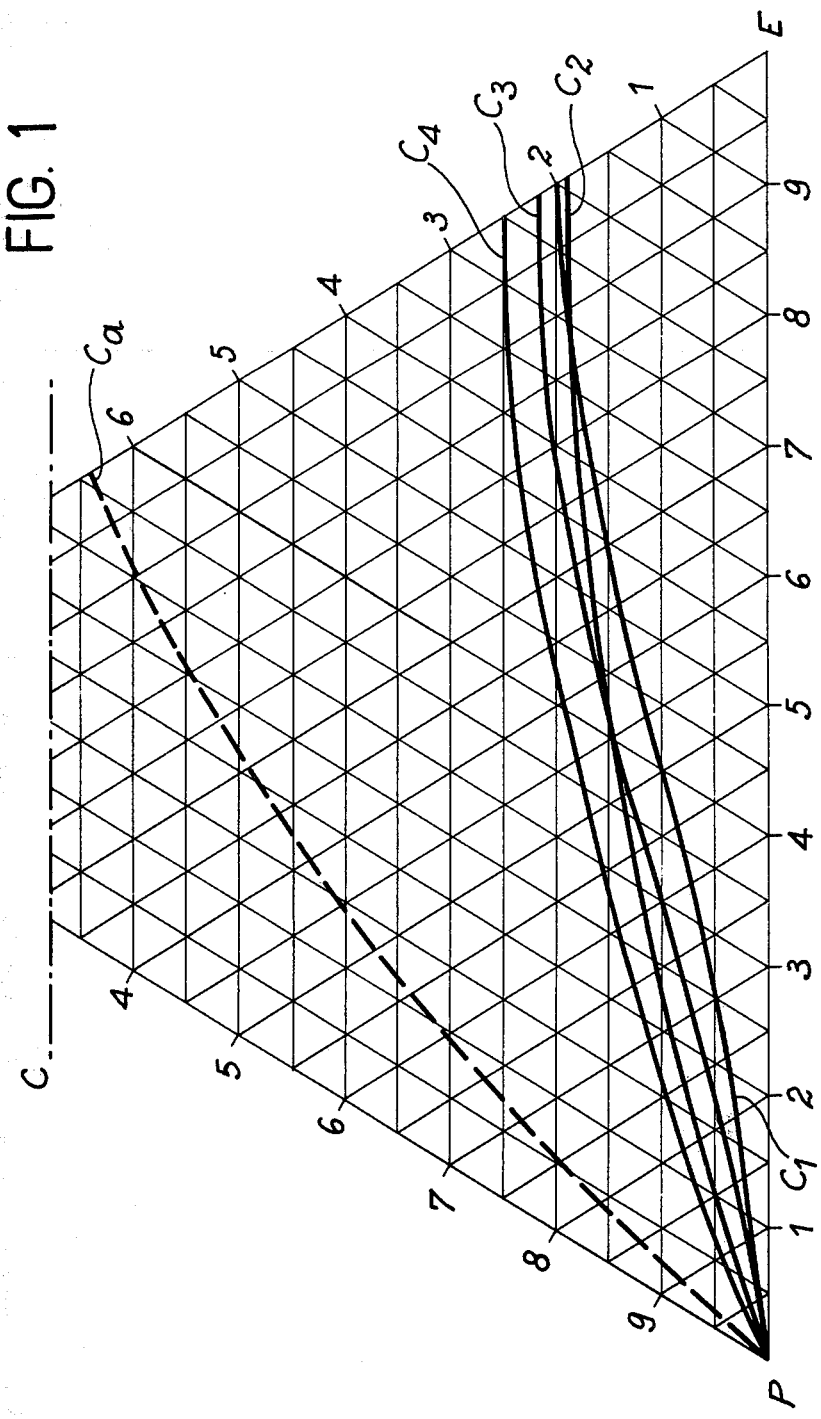

United States Patent [19] [11] 4,252,657
Barriol et al. [45] Feb. 24, 1981

[54] CONCENTRATE FOR THE PREPARATION OF OIL AND WATER MICROEMULSIONS HAVING HIGH SALINITY WHICH ARE STABLE AT HIGH TEMPERATURE

[75] Inventors: Jean-Paul Barriol, Grigny; Jean-Francois Coste, Muret; Henri Grangette, Lyon, all of France

[73] Assignee: Societe Nationale Elf Aquitaine, Paris, France

[21] Appl. No.: 857,882

[22] Filed: Dec. 6, 1977

[30] Foreign Application Priority Data

Dec. 10, 1976 [FR] France ............................ 76 37246
Jun. 24, 1977 [FR] France ............................ 77 19393

[51] Int. Cl.$^3$ ............................................. E21B 43/22
[52] U.S. Cl. .............................. 252/8.55 D; 166/275; 252/308; 252/312
[58] Field of Search ................. 252/8.55 D, 8.55 B, 252/312; 166/274, 275

[56] References Cited

U.S. PATENT DOCUMENTS

| | | | |
|---|---|---|---|
| 2,356,205 | 8/1944 | Blair et al. | 252/8.55 |
| 3,500,912 | 3/1970 | Davis et al. | 252/312 X |
| 3,504,744 | 4/1970 | Davis et al. | 252/312 |
| 3,536,136 | 10/1970 | Jones | 252/8.55 |
| 3,753,904 | 8/1973 | Holm | 252/8.55 |
| 3,769,209 | 10/1973 | Holm | 252/8.55 |

*Primary Examiner*—Herbert B. Guynn

[57] ABSTRACT

Oil and water microemulsions having a high salt content and intended for assisted petroleum recovery are prepared from a concentrate containing:

- a mixture of at least three surfactants constituted respectively by a salt of an alkylsulphuric acid, a salt of an alkylaryl sulphonic acid and a salt of a carboxylic acid derivative selected from the group comprising sulphosuccinic acid and sulphosuccinamic acid,
- at least one cosurfactant constituted by a compound which is capable of forming hydrogen bonds with water.

42 Claims, 3 Drawing Figures

CONCENTRATE FOR THE PREPARATION OF OIL AND WATER MICROEMULSIONS HAVING HIGH SALINITY WHICH ARE STABLE AT HIGH TEMPERATURE

This invention relates to a concentrate for the preparation of oil and water microemulsions having high salinity which are stable at high temperature and to a microemulsion which is intended for assisted petroleum recovery and prepared from the concentrate in accordance with the invention.

It is recalled that, when suitable quantities of oil and water are added, a concentrate for the preparation of oil and water microemulsions results in the production of a homogeneous and stable solution of oil and water in which the water or oil is present in a highly divided form, that is, in the form of droplets having a size within the range of 100 to 1400 Å.

It is known that a concentrate for the preparation of an oil and water microemulsion usually contains at least one surfactant and one cosurfactant.

It is known that there already exists a wide range of concentrates of the general type mentioned above and comprising one or a number of anionic surfactants such as a sulphonate, an alkyl-sulphate or an alkyl-sulphonate. However, these concentrates do not permit the preparation of oil and water microemulsions having high salinity since they contain surfactants which precipitate in the presence of monovalent and divalent ions.

It is also known that concentrates having a base of non-ionic surfactants are employed in the preparation of high-salinity microemulsions. These concentrates do not make it possible, however, to obtain high-salinity microemulsions which are indefinitely stable in time at high temperature.

Moreover, the concentrates of the prior art suffer from a further disadvantage in that they fail to produce water and oil microemulsions having a wide range of different compositions of water, oil and concentrate.

The precise aim of the present invention is to provide a concentrate for the production of microemulsions which makes it possible to overcome the disadvantages attached to concentrates of the prior art.

The concentrate in accordance with the invention essentially comprises:
 a mixture of at least three surfactants constituted respectively by a salt of an alkylsulphuric acid, a salt of an alkylaryl sulphonic acid and a salt of a derivative of a carboxylic acid selected from the group comprising sulphosuccinic acid and sulphosuccinamic acid;
 at least one cosurfactant constituted by a compound which is capable of forming hydrogen bonds with water.

The concentrate in accordance with the invention as defined in the foregoing derives advantage from the nature of the mixture of the three surfactants contained therein. In fact, the judicious association of a salt of an alkylsulphuric acid, of a salt of an alkylaryl sulphonic acid and a salt of a derivative of a sulphosuccinic acid or of a sulphosuccinamic acid endows the concentrate with a high degree of efficiency in the stabilization of interfaces of an oil and water microemulsion in the presence of an appreciable quantity of monovalent and divalent salts and at a high temperature.

Moreover, the concentrate in accordance with the invention makes it possible to obtain a very broad range of microemulsions each characterized by a given composition of concentrate, oil and water.

Thus the concentrate in accordance with the invention can be employed for many different applications.

It is worthy of note that the concentrate is particularly well-suited to the preparation of microemulsions for use in assisted recovery of petroleum from a native reservoir in which the water has high salinity.

It is recalled that assisted recovery of crude petroleum by injection of microemulsions consists in carrying out displacement of the crude petroleum retained in the pores of the deposit by solubilization of the petroleum in the microemulsion.

Thus, in order to carry out assisted recovery of petroleum from a native reservoir containing water which has high salinity, the concentrate in accordance with the invention will advantageously permit the preparation of microemulsions of an oil constituted by crude petroleum or by at least one petroleum cut and water having a monovalent ion salinity within the range of 30 to 80 g/l and a divalent ion salinity within the range of 0 to 15 g/l, said microemulsions being stable at a temperature within the range of 30° to 80° C. at atmospheric pressure.

Moreover, the concentrate will make it possible to dissolve in these microemulsions appreciable quantities of petroleum or water, depending on the nature of the continuous phase.

In accordance with the invention, the mixture of said surfactants of the concentrate is preferably a mixture of sodium salts. However, it can also be constituted by a mixture of lithium, potassium or ammonium salts.

Furthermore and in accordance with the invention, the salt of an alkylsulphuric acid of said mixture is preferably an alkylsulphate in which the alkyl radical contains 6 to 22 carbon atoms.

Moreover, the salt of an alkylaryl sulphonic acid of said mixture can contain one or a number of sulphonate functions, the mean molecular weight of the salt being preferably within the range of 300 to 600. The definition and measurement of the mean molecular weight of a sulphonate are given in the ASTM D 855 standard.

In accordance with the invention, said sulphosuccinic acid derivative can advantageously be constituted by a sulphosuccinic acid diester corresponding to the general formula:

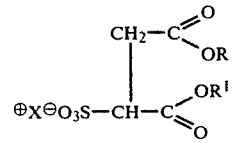

where the R and R[1] radicals are saturated or unsaturated, substituted or non-substituted hydrocarbon radicals having 4 to 22 carbon atoms and where X+ is selected from the group comprising the lithium, sodium, potassium and ammonium ions.

The sulphosuccinic acid derivative aforesaid can also be constituted by a monoester of alkylsuccinic acid corresponding to the general formula:

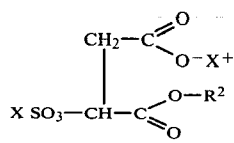

where $R^2$ is a saturated or unsaturated, substituted or nonsubstituted hydrocarbon radical having 4 to 22 carbon atoms and preferably corresponding to the general formula:

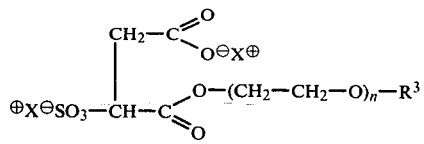

where the $R^3$ radical is a saturated or unsaturated hydrocarbon radical having from 4 to 22 carbon atoms, n is a whole number between 0 and 20 and $X^+$ is selected from the group comprising the lithium, sodium, potassium and ammonium ions.

The sulphosuccinic acid derivative can advantageously be constituted by disodium nonylphenoxypolyethoxysulphosuccinate or disodium dodecanoxypolyethoxysulphosuccinate.

Moreover and in accordance with the invention, said sulphosuccinamic acid derivative is preferably constituted by a salt of a sulphosuccinamic acid derivative corresponding to the general formula:

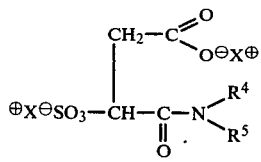

where $R^4$ and $R^5$ are in each case an H radical or a saturated or unsaturated, substituted or non-substituted hydrocarbon radical having from 4 to 22 carbon atoms, $R^4$ and $R^5$ being different when $R^4$ or $R^5$ is the H radical and $X^+$ is selected from the group comprising the lithium, sodium, potassium and ammonium ions.

Also, the sulphosuccinamic acid derivative tetrasodium N(1,2-dicarboxyethyl)-N-octadecylsulphosuccinamate can be advantageously used.

In regard to the cosurfactant or cosurfactants of the concentrate in accordance with the invention, these latter are constituted by compounds selected from the group comprising the ethers and polyethers such as the ethers of mono- or polyethylene glycol, the amines, the aminoalcohols, the carboxylic acids, the mono- or polyhydroxylated alcohols such as isobutanol.

In accordance with the invention, the concentrate preferably has the following composition:
the weight percentage of each aforesaid surfactant in the mixture is within the range of 10 to 80% and preferably 10 to 60%.
the weight percentage of the cosurfactant or cosurfactants in said surfactants mixture being within the range of 5 to 50%, this ratio being correspondingly higher as the hydrocarbon of the microemulsion to be prepared has a higher molecular weight.

The present invention is also directed to a microemulsion for the assisted recovery of petroleum from a saline deposit, said microemulsion being obtained by adding to the concentrate of the invention an oil constituted by crude petroleum or by at least one petroleum cut such as gas oil or kerosene and water having a monovalent ion salinity within the range of 30 to 80 g/l and a divalent ion salinity within the range of 0 to 15 g/l.

The microemulsion in accordance with the present invention essentially contains 10 to 30% of a concentrate comprising:
a mixture of at least three surfactants constituted respectively by a salt of an alkylsulphuric acid, a salt of an alkylaryl sulphonic acid and a salt of a carboxylic acid derivative selected from the group comprising sulphosuccinic acid and sulphosuccinamic acid, at least one cosurfactant constituted by a compound which is capable of forming hydrogen bonds with water;
X% of a crude petroleum or of at least one petroleum cut;
Y% of water having a monovalent ion salinity within the range of 30 to 80 g/l and a divalent ion salinity within the range of 0 to 15 g/l, where X is approximately equal to 2 Y.

The microemulsion as defined in the foregoing has the main advantage of being stable in time at a temperature within the range of 30° to 80° C. at atmospheric pressure and of permitting dissolution of appreciable quantities of petroleum.

It should be pointed out that a microemulsion in accordance with the invention advantageously comprises a concentrate which preferentially contains the surfactants given in the foregoing.

Thus said microemulsion preferably contains an alkylsulphate in which the alkyl radical has 6 to 22 carbon atoms, an alkylaryl sulphonate having a mean molecular weight within the range of 300 to 600, a monoester or a diester of the sulphosuccinic acid hereinabove defined and the salt of a sulphosuccinamic acid in which the amine function is substituted by at least one saturated or unsaturated, substituted or non-substituted hydrocarbon radical.

Moreover and in accordance with the invention, the microemulsion preferably contains 25% of concentrate, 50% of crude petroleum or petroleum cuts and 25% of water.

The crude petroleum and the water of the microemulsion in accordance with this invention preferably have physical and chemical characteristics which are substantially identical with those of the water and petroleum of the deposit.

A microemulsion in accordance with the invention which is particularly well-suited to assisted recovery of petroleum from a saline deposit contains:
(a) 25% of a concentrate constituted by;
a salt of an alkylsulphuric acid in which the alkyl radical has 6 to 22 carbon atoms,
an alkylsulphosuccinate corresponding to the general formula:

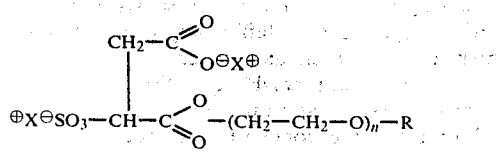

where R is a saturated or unsaturated hydrocarbon having 4 to 22 carbon atoms, n is a whole number between 0 and 20 and $X^{\oplus}$ is selected from the group comprising the lithium, the sodium, potassium and ammonium ions, alkylaryl sulphonates having a mean molecular weight between 300 and 600 and a monohydroxylated alcohol;

(b) 50% of crude petroleum or of at least one petroleum cut;

(c) 25% of water having a monovalent ion salinity within the range of 50 to 60 g/l and a divalent ion salinity within the range of 5 to 10 g/l.

The preferential formulation of a microemulsion of this type is as follows:

25% of a concentrate containing lauryl sodium sulphate, disodium nonylphenoxypolyethoxysulphosuccinate, alkylarylsulphonates and isopropanol;

50% of crude petroleum or of at least one petroleum cut;

25% of water having a monovalent ion salinity which is equal to 57 g/l and a divalent ion salinity equal to 9.7 g/l.

The advantages and distinctive features of the present invention will become more clearly apparent from the following description of preferential formulations of the concentrate in accordance with the invention and of displacement tests in core samples for simulating assisted petroleum recovery from a deposit by injection of a microemulsion in accordance with the invention.

Preferential formulations of the concentrate in accordance with the invention are given hereinafter by way of explanatory illustration but not in any sense by way of limitation.

In the case of each formulation given below, there is shown in the accompanying FIGS. 1 to 3 a ternary diagram of concentrate (C)—deposit water (E)—hydrocarbon (P). This latter is represented by a crude petroleum having a specific gravity of 0.860 at 15° C., an API gravity of 32.95, a viscosity of 7.10 cst at 37.8° C., a UOP characterization factor of 11.90, and having the following composition:

| Cut | % Aromatics | % Naphthenes | % Paraffins |
|---|---|---|---|
| 80–150° C. | 3.4 | 27.9 | 68.7 |
| 100–180° C. | 6.9 | 27.7 | 65.4 |
| 150–180° C. | 10.7 | 28.2 | 61.4 |

There is plotted in the case of each formulation the curve which separates the field of homogeneous solutions or microemulsions which is located above said curve from the field of two-phase compositions located beneath said curve.

More specifically, FIG. 1 shows curves illustrating the range of microemulsions obtained with concentrates $C_1$, $C_2$, $C_3$ and $C_4$ prepared according to Examples 1-4, respectively, hereinafter set forth, and also compared with a concentrate $C_A$ containing only two surfactants; FIG. 2 shows similar curves for concentrates $C_5$, $C_6$, $C_7$ and $C_8$ prepared according to Examples 5-8, respectively; and FIG. 3 shows similar curves for concentrates $C_9$, $C_{10}$, $C_{11}$ and $C_{12}$ prepared according to Examples 9-12, respectively.

In the case of Examples 1, 2, 3 and 4 given hereinafter, the oil-field water mainly contains 80 g/l of NaCl and less than 0.1% divalent ion salts.

EXAMPLE 1

A concentrate in accordance with the invention is prepared by mixing:

10% by weight of an alkylsulphate solution marketed under the name of Odoripon Al 95 by Voreppe Chemical Industries; this solution contains 95% lauryl sodium sulphate;

33.3% by weight of a sulphosuccinamate solution marketed under the name of Aerosol 22 by the American Cyanamid Company; this solution contains 35% tetrasodium N(1,2 dicarboxyethyl)-N-octadecylsulphosuccinamate;

25% by weight of an alkylaryl sulphonate solution marketed under the name of Petroleum sulphonate TRS 18 by the Witco Chemical Company; this solution contains 62% alkylaryl sulphonates having a mean molecular weight equal to 495;

11.6% isobutanol;

20% oil-field water containing 80 g/l of NaCl.

From the position of the curve designated as $C_1$ in the ternary diagram of FIG. 1, it is apparent that the concentrate according to the invention and having the formulation given above makes it possible to obtain a wide range of microemulsions with an oil-field water containing 80 g/l of NaCl and the crude petroleum P.

EXAMPLE 2

A concentrate in accordance with the invention is prepared by mixing:

12.5% Odoripon Al 95,
41.7% Aerosol 22,
31.3% Petroleum sulphonate TRS 18,
14.5% isobutanol.

In the accompanying ternary diagram, the curve $C_2$ of FIG. 1 corresponds to this concentrate.

EXAMPLE 3

A concentrate in accordance with the invention is prepared by mixing:

20% Odoripon Al 95,
29.75% Aerosol 22,
22.25% Petroleum sulphonate TRS 18,
10.25% isobutanol,
17.75% oil-field water containing 80 g/l of NaCl.

The curve $C_3$ of FIG. 1 corresponds to the concentrate of this example.

EXAMPLE 4

A concentrate in accordance with the invention is prepared by mixing:

14.25% Odoripon Al 95,
29.6% Aerosol 22,
28.4% Petroleum sulphonate TRS 18,
10.1% isobutanol,
17.6% oil-field water containing 80 g/l equivalent NaCl.

The curve $C_4$ of FIG. 1 corresponds to the concentrate of Example 4.

In order to bring out the advantageous features of the concentrate in accordance with the invention, there has been shown in chain-dotted lines in the ternary diagram of FIG. 1 the curve $C_a$ of a concentrate which contains only two of the three surfactants of concentrates 1 to 4. It will be noted that the curve of this concentrate is located distinctly above the curves $C_1$ to $C_4$.

In Examples 5, 6, 7 and 8 given below, there are produced microemulsions having a base of the concentrates defined hereunder and of oil-field water containing variable percentages of monovalent and divalent ions; the hydrocarbon still remains the crude petroleum (P) which was defined earlier.

EXAMPLE 5

A concentrate in accordance with the invention is prepared by mixing:
- 36% by volume of a sodium sulphosuccinate solution marketed under the name Aerosol A 103 by the American Cyanamid Company; this solution contains 35% disodium nonylphenoxypolyethoxysulphosuccinate,
- 24% Odoripon AL 95,
- 27% Petroleum sulphonate TRS 18,
- 13% isobutanol.

Figure 2:
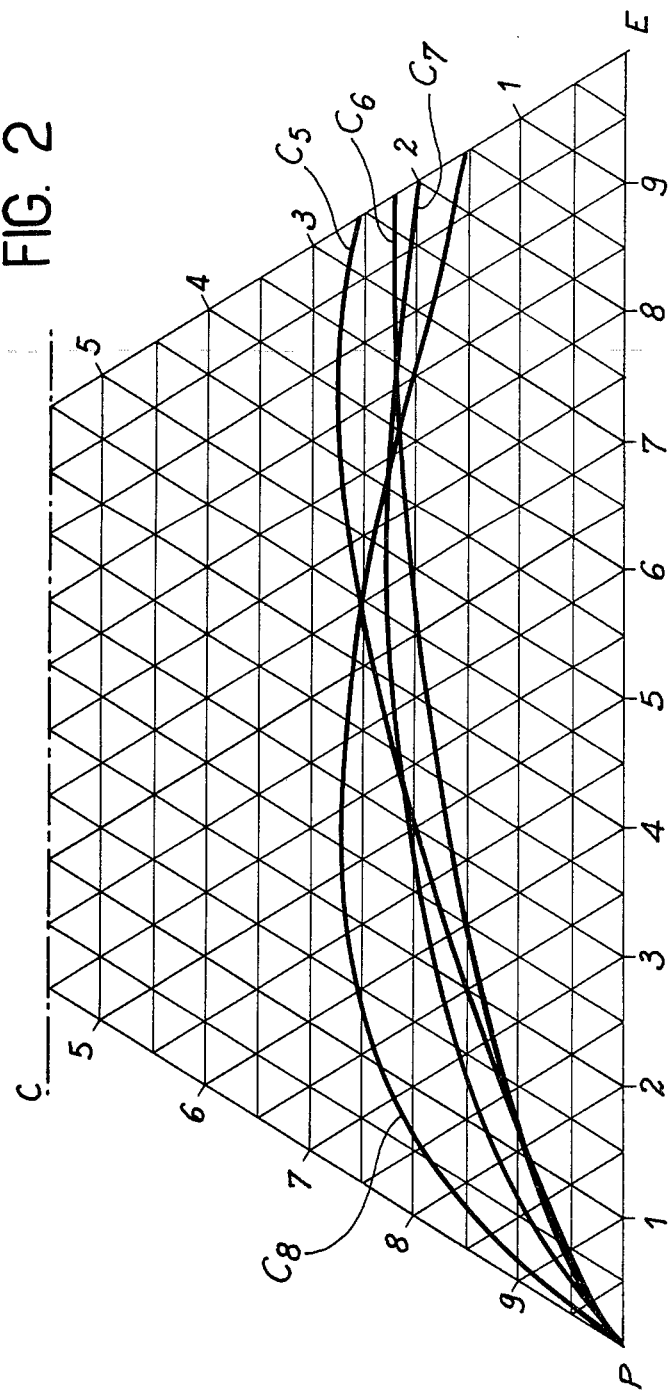

Curve $C_5$ of FIG. 2 serves to define the microemulsions prepared from this concentrate, from the hydrocarbon (P) and from an oil-field water mainly containing 30 g/l of NaCl and less than 0.1% divalent ion salts.

EXAMPLE 6

A concentrate in accordance with the invention is prepared by mixing:
- 36% Aerosol A 103,
- 24% Odoripon AL 95,
- 27% Petroleum sulphonate TRS 18,
- 13% isopropanol.

The curve $C_6$ corresponds to this concentrate in the ternary diagram of FIG. 2. The oil-field water mainly contains 57 g/l of NaCl and 9.7 g/l of $CaCl_2$.

EXAMPLE 7

A concentrate in accordance with the invention is prepared by mixing:
- 36% Aerosol A 103,
- 24% Odoripon AL 95,
- 27% Petroleum sulphonate TRS 18,
- 6.5% isopropanol,
- 6.5% isobutanol.

The curve $C_7$ corresponds to this concentrate in the ternary diagram of FIG. 2. The oil-field water mainly contains 70.2 g/l of NaCl and 11.6 g/l of $CaCl_2$.

EXAMPLE 8

A concentrate in accordance with the invention is prepared by mixing:
- 39.6% by volume of a sodium sulphosuccinate solution marketed under the name Aerosol A 102 by the American Cyanamid Company; this solution contains 30% disodium dodecanoxypolyethoxysulphosuccinate,
- 22.6% Odoripon AL 95,
- 25.5% Petroleum sulphonate TRS 18,
- 12.3% isobutanol.

The curve $C_8$ corresponds to this concentrate in the ternary diagram of FIG. 2. The oil-field water mainly contains 80 g/l of NaCl and 15 g/l of $CaCl_2$.

In Examples 9, 10, 11 and 12 given below, there are produced microemulsions having a base of the concentrates defined hereunder, of the hydrocarbon (P) and of the oil-field water which contains 70.2 g/l of NaCl and 11.6 g/l of $CaCl_2$ at variable temperatures.

EXAMPLE 9

A concentrate in accordance with the invention is prepared by mixing:
- 36% Aerosol A 103,
- 24% Odoripon AL 95,
- 9% of a solution of alkylarylsulphonates marketed under the name of Petroleum sulphonate TRS 10; this solution contains 62% alkylarylsulphonates having a mean molecular weight of 420,
- 9% of a solution of alkylarylsulphonates marketed under the name of Petroleum sulphonate TRS 16; this solution contains 62% alkylarylsulphonates having a mean molecular weight of 450,
- 9% Petroleum sulphonate TRS 18,
- 13% isopropanol.

Figure 3:
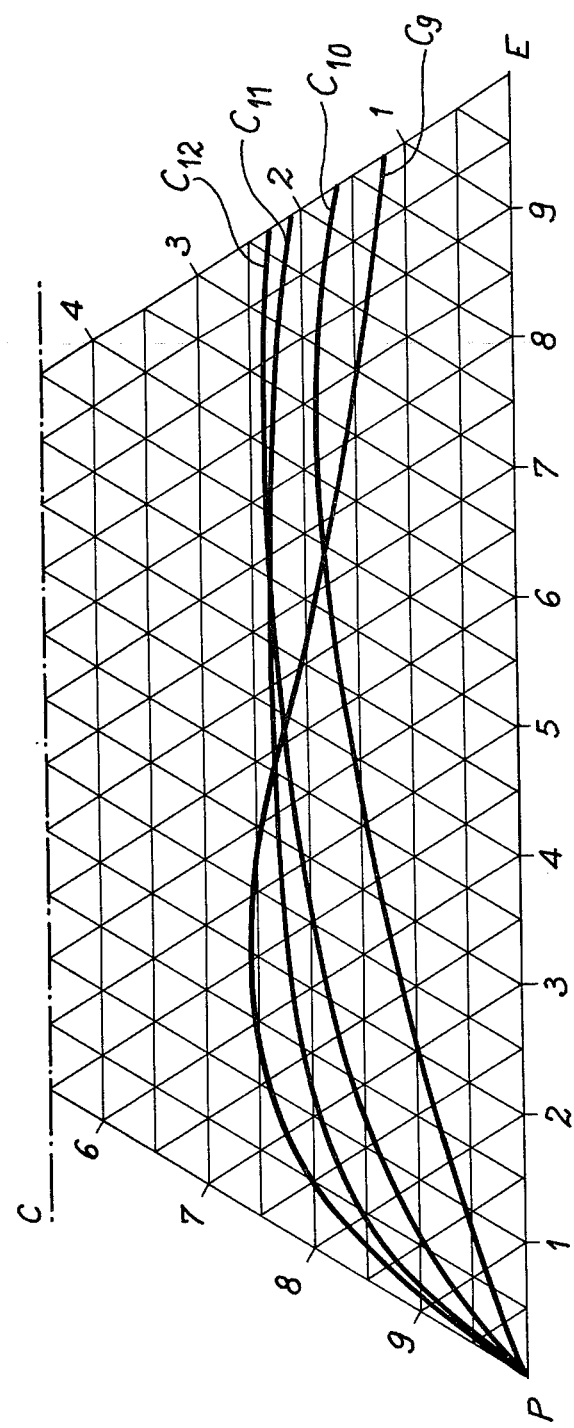

The curve $C_9$ of FIG. 3 serves to define the corresponding microemulsions at 37° C.

EXAMPLE 10

A concentrate in accordance with the invention is prepared by mixing:
- 36% Aerosol A 103,
- 24% Odoripon AL 95,
- 9% Petroleum sulphonate TRS 10,
- 9% Petroleum sulphonate TRS 16,
- 9% Petroleum sulphonate TRS 18,
- 6.5% isopropanol,
- 6.5% isobutanol.

The curve $C_{10}$ of FIG. 3 serves to define the corresponding microemulsions at 45° C.

EXAMPLE 11

A concentrate in accordance with the invention is prepared by mixing:
- 19.8% Aerosol A 102,
- 19.8% Aerosol A 103,
- 22.6% Odoripon AL 95,
- 25.5% Petroleum sulphonate TRS 18,
- 6.15% isopropanol.
- 6.15% isobutanol.

The curve $C_{11}$ of FIG. 3 serves to define the corresponding microemulsions at 60° C.

EXAMPLE 12

A concentrate in accordance with the invention is prepared by mixing:
- 19.8% Aerosol A 102,
- 18% Aerosol A 103,
- 23.3% Odoripon AL 95,
- 4.5% Petroleum sulphonate TRS 10,
- 4.5% Petroleum sulphonate TRS 16,
- 17.2% Petroleum sulphonate TRS 18,
- 9.6% isopropanol,
- 3.1% isobutanol.

The curve $C_{12}$ of FIG. 3 serves to define the corresponding microemulsions at 80° C.

There are described hereinafter by way of explanatory illustration but not in any sense by way of limitation two displacement tests within core samples for simulating assisted petroleum recovery from a deposit by injecting a microemulsion obtained from a concentrate having the formulation of Example 6. These tests which are given by way of example but not in any limiting sense are carried out with the same microemulsion in two different core samples.

The microemulsion employed in these tests contains:
- 25% of a concentrate containing 36% by volume of a sodium sulphosuccinate solution marketed under the name Aerosol A 103 by the American Cyanamid Company (solution containing 35% nonylphenoxypolyethoxysulphosuccinate), 24% by volume of an alkylsulphate solution marketed under the name of Odoripon AL 95 by the Voreppe Chemical Industries (solution containing 95% lauryl sodium sulphate), 27% by volume of a solution of alkylaryl sulphonates marketed under the name of Petroleum sulphonate TRS 18 by the Witco Chemical Company (solution containing 62% alkylaryl sulphonates), and 13% isopropanol;

50% of a crude Petroleum having a specific gravity of 0.860 at 15° C., an API gravity of 32.95, a viscosity of 7.10 cst at 37.8° C., a UOP characterization factor of 11.90 and having the following composition:

| Cut | % Aromatics | % Naphthenes | % Paraffins |
|---|---|---|---|
| 80–150° C. | 3.4 | 27.9 | 68.7 |
| 100–180° C. | 6.9 | 27.7 | 65.4 |
| 150–180° C. | 10.7 | 28.2 | 61.4 |

25% of a water which mainly contains 57 g/l of NaCl and 9.7 g/l of CaCl$_2$.

The core samples employed in these tests are rods of Vosges sandstone, the characteristics of which are given in the table hereunder in respect of tests 1 and 2. In the case of each test, the core sample employed is mounted in a standarized (API) Hassler cell in order to work under conditions of pressure and temperature which are substantially identical with those existing in the oil field.

Before performing the displacement tests, operations involving injection of petroleum and water into the core samples are carried out in order to establish within these latter a petroleum and water phase distribution which is exactly the same as the distribution existing in an oil field after an operation involving secondary petroleum recovery by injection of water.

These operations consist in carrying out successively an injection of water until saturation with water is achieved, an injection of petroleum for placing the interstitial water followed by a further water injection until saturation of the core sample with petroleum corresponds to the residual saturation (that is, to minimum saturation with petroleum which can no longer be driven out by water).

It should be pointed out that the water and the petroleum which are injected into the core sample are advantageously those employed in the composition of the microemulsion.

The tests consist in injecting a volume of microemulsion expressed as a pore volume in the vicinity of unity at a rate such that the linear velocity of forward displacement of the microemulsion within the core sample is of the order of 30.480 cm per diem. During the tests, the petroleum and water effluents are collected in time in order to control progressive variation of saturations while the core sample is being swept by the microemulsion.

The conditions of performance of the tests (characteristics of the core samples and volume of injected microemulsion) as well as the results obtained are recorded in the following table.

| TESTS | φ | k$_W$ | k$_O$(Sw$_i$) | k$_W$(SOR) | SOR | VµE | R |
|---|---|---|---|---|---|---|---|
| No 1 | 0.22 | 1992 | 898 | 33 | 0.415 | 0.85 | 0.94 |
| No 2 | 0.12 | 170 | 33.8 | 14 | 0.557 | 1.00 | 0.98 |

In this table:

φ designates the porosity of the sandstone rod;

k$_W$ designates the permeability of the water-porous medium (in milli-Darcy);

k$_O$(Sw$_i$) designates the permeability of the hydrocarbon-porous medium at initial saturation with water (in milli-Darcy);

k$_W$(SOR) designates the permeability of the water-porous medium at residual saturation with oil (in milli-Darcy);

SOR designates the residual saturation with hydrocarbon;

VµE designates the volume of the microemulsion plug expressed as a percentage of the pore volume;

R designates the rate of tertiary hydrocarbon recovery.

It is worthy of note that the microemulsion in accordance with the present patent application makes it possible to attain a highly satisfactory percentage of assisted petroleum recovery.

We claim:

1. A concentrate for the preparation of oil and water microemulsions having high salinity which are stable at high temperature, wherein said concentrate comprises:

a mixture of at least three surfactants constituted respectively by a salt of an alkylsulphuric acid wherein the alkyl radical has from 6 to 22 carbon atoms, a salt of an alkylaryl sulphonic acid having a mean molecular weight within the range of 300 to 600, and a salt of a derivative of a carboxylic acid selected from the group consisting of a sulphosuccinic acid derivative corresponding to the general formula:

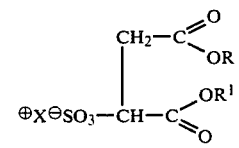

wherein the R and R$^1$ radicals are saturated or unsaturated hydrocarbon radicals having from 4 to 22 carbon atoms and X$^+$ is selected from the group consisting of lithium, sodium, potassium and ammonium ions, and of a sulphosuccinamic acid derivative corresponding to the general formula:

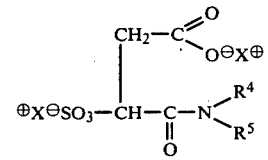

wherein R$^4$ and R$^5$ are each an H radical or a hydrocarbon radical which is saturated or unsaturated, and has from 4 to 22 carbon atoms, R$^4$ and R$^5$ being different when R$^4$ or R$^5$ is an H radical, and X$^+$ is selected from the group consisting of lithium, sodium, potassium and ammonium ions, the weight percentage of each surfactant aforesaid in said mixture being within the range of 10 to 80%; and at least one cosurfactant constituted by a compound which is capable of forming hydrogen bonds with water, the weight percentage of the cosurfactant or cosurfactants in said surfactants mixture being within the range of 5 to 50%.

2. A concentrate according to claim 1, wherein the salts of an alkylsulphuric acid and of an alkylaryl sulphonic acid are salts of a metal selected from the group consisting of sodium, lithium, potassium and ammonium.

3. A concentrate according to claim 1, wherein said cosurfactant is selected from the group consisting of the mono- or polyhydroxylated alcohols.

4. A concentrate according to claim 1, wherein the weight percentage of each surfactant aforesaid in said mixture is within the range of 10 to 60%.

5. A concentrate for the preparation of oil and water microemulsions having high salinity which are stable at high temperature, wherein said concentrate comprises
   a mixture of at least three surfactants constituted respectively by a salt of an alkylsulphuric acid wherein the alkyl radical has from 6 to 22 carbon atoms, a salt of an alkylaryl sulphonic acid having a mean molecular weight within the range of 300 to 600, and a salt of a derivative of a carboxylic acid selected from the group consisting of a sulphosuccinic acid derivative corresponding to the general formula:

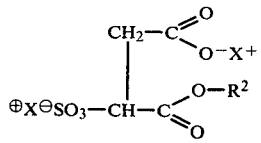

wherein $R^2$ is a saturated or unsaturated hydrocarbon radical having from 4 to 22 carbon atoms, and $X^+$ is selected from the group consisting of lithium, sodium, potassium and ammonium ions, and of a sulphosuccinamic acid derivative corresponding to the general formula:

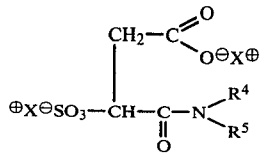

wherein $R^4$ and $R^5$ are each an H radical or a hydrocarbon radical which is saturated or unsaturated, and has from 4 to 22 carbon atoms, $R^4$ and $R^5$ being different when $R^4$ or $R^5$ is an H radical, and $X^+$ is selected from the group consisting of lithium, sodium, potassium and ammonium ions, the weight percentage of each surfactant aforesaid in said mixture being within the range of 10 to 80%; and
   at least one cosurfactant constituted by a compound which is capable of forming hydrogen bonds with water, the weight percentage of the cosurfactant or cosurfactants in said surfactants mixture being within the range of 5 to 50%.

6. A concentrate according to claim 5 wherein the salts of an alkylsulphuric acid and of an alkylaryl sulphonic acid are salts of a metal selected from the group consisting of sodium, lithium, potassium and ammonium.

7. A concentrate according to claim 5 wherein said cosurfactant is selected from the group consisting of mono or polyhydroxylated alcohols.

8. A concentrate according to claim 5, wherein the weight percentage of each surfactant aforesaid in said mixture is within the range of 10 to 60%.

9. A concentrate for the preparation of oil and water microemulsions having high salinity which are stable at high temperature, wherein said concentrate comprises:
   a mixture of at least three surfactants constituted respectively by a salt of an alkylsulphuric acid wherein the alkyl radical has from 6 to 22 carbon atoms, a salt of an alkylaryl sulphonic acid having a mean molecular weight within the range of 300 to 600, and a salt of a derivative of a carboxylic acid selected from the group consisting of a sulphosuccinic acid derivative corresponding to the general formula:

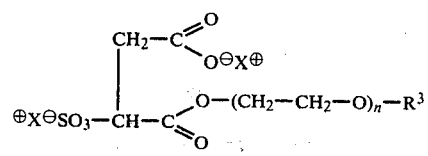

wherein the radical $R^3$ is a saturated or unsaturated hydrocarbon radical having from 4 to 22 carbon atoms, n is a whole number between 0 and 20 and $X^+$ is selected from the group consisting of lithium, sodium, potassium and ammonium ions, and of a sulphosuccinamic acid derivative corresponding to the general formula:

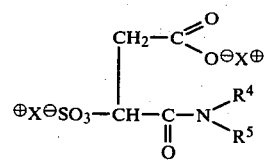

wherein $R^4$ and $R^5$ are each an H radical or a hydrocarbon radical which is saturated or unsaturated, and has from 4 to 22 carbon atoms, $R^4$ and $R^5$ being different when $R^4$ or $R^5$ is an H radical, and $X^+$ is selected from the group consisting of lithium, sodium, potassium and ammonium ions, wherein the weight percentage of each surfactant aforesaid in said mixture being within the range of 10 to 80%; and
   at least one cosurfactant constituted by a compound which is capable of forming hydrogen bonds with water, the weight percentage of the cosurfactant or cosurfactants in said surfactants mixture being within the range of 5 to 50%.

10. A concentrate according to claim 9 wherein the salts of an alkylsulphuric acid and of an alkylaryl sulphonic acid are salts of a metal selected from the group consisting of sodium, lithium, potassium and ammonium.

11. A concentrate according to claim 9 wherein said cosurfactant is selected from the group consisting of mono or polyhydroxylated alcohols.

12. A concentrate according to claim 9 wherein the weight percentage of each surfactant aforesaid in said mixture is within the range of 10 to 60%.

13. A concentrate for the preparation of oil and water microemulsions having high salinity which are stable at high temperature, wherein said concentrate comprises:

a mixture of at least three surfactants constituted respectively by a salt of an alkylsulphuric acid wherein the alkyl radical has from 6 to 22 carbon atoms, a salt of an alkylaryl sulphonic acid having a mean molecular weight within the range of 300 to 600, and at least a salt of a derivative of a carboxylic acid selected from the group consisting of disodium nonylphenoxypolyethoxysulphosuccinate, disodium dodecanoxy polyethoxysulphosuccinate, each having between 0 and 20 ethoxy groups, tetrasodium N(1,2 dicarboxyethyl)-N-octadecylsulphosuccinamate, the weight percentage of each surfactant aforesaid in said mixture being within the range of 10 to 80%; and at least one cosurfactant constituted by a compound which is capable of forming hydrogen bonds with water, the weight percentage of the cosurfactant or cosurfactants in said surfactants mixture being within the range of 5 to 50%.

14. A concentrate according to claim 13, wherein the salts of an alkylsulphuric acid and of an alkylaryl sulphonic acid are salts of a metal selected from the group consisting of sodium, lithium, potassium and ammonium.

15. A concentrate according to claim 13, wherein said cosurfactant is selected from the group consisting of mono or polyhydroxylated alcohols.

16. A concentrate according to claim 13, wherein the weight percentage of each surfactant aforesaid in said mixture is within the range of 10 to 60%.

17. A microemulsion for assisted petroleum recovery from a deposit in which the water has high salinity, wherein said microemulsion contains by weight:

(a) 10 to 30% of a concentrate comprising:

a mixture of at least three surfactants constituted respectively by a salt of an alkylsulphuric acid wherein the alkyl radical has from 6 to 22 carbon atoms, a salt of an alkylaryl sulphonic acid having a mean molecular weight within the range of 300 to 600, and a salt of a derivative of a carboxylic acid selected from the group consisting of a sulphosuccinic acid derivative corresponding to the general formula:

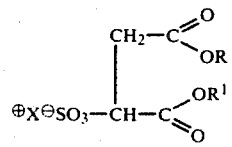

wherein the R and R$^1$ radicals are saturated or unsaturated hydrocarbon radicals having from 4 to 22 carbon atoms and X$^+$ is selected from the group consisting of lithium, sodium, potassium and ammonium ions, and of a sulphosuccinamic acid derivative corresponding to the general formula:

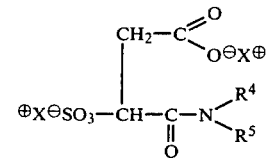

wherein the R$^4$ and R$^5$ are each an H radical or a hydrocarbon radical which is saturated or unsaturated, and has from 4 to 22 carbon atoms, R$^4$ and R$^5$ being different when R$^4$ or R$^5$ is an H radical, and X$^+$ is selected from the group consisting of lithium, sodium, potassium and ammonium ions, the weight percentage of each surfactant aforesaid in said mixture being within the range of 10 to 80%; and at least one cosurfactant constituted by a compound which is capable of forming hydrogen bonds with water, the weight percentage of the cosurfactant or cosurfactants in said surfactants mixture being within the range of 5 to 50%, (b) X % of crude petroleum or of at least one petroleum cut;

(c) Y % of water having a monovalent ion salinity within the range of 30 to 80 g/l and a divalent ion salinity within the range of 0 to 15 g/l, X being approximately equal to 2Y.

18. A microemulsion according to claim 17, wherein said microemulsion contains 25% of said concentrate, 50% of oil and 25% of water.

19. A microemulsion according to claim 17, wherein said microemulsion contains crude petroleum and water having physical and chemical characteristics which are substantially identical with those of the deposit.

20. A microemulsion according to claim 17, wherein the salts of an alkylsulphuric acid and of an alkylaryl sulphonic acid are salts of a metal selected from the group consisting of sodium, lithium, potassium and ammonium.

21. A microemulsion according to claim 17, wherein said cosurfactant is selected from the group consisting of the mono- or polyhydroxylated alcohols.

22. A microemulsion according to claim 17, wherein the weight percentage of each surfactant aforesaid in said mixture is within the range of 10 to 60%.

23. A microemulsion for assisted petroleum recovery from a deposit in which the water has high salinity, wherein said microemulsion contains by weight:

(a) 10 to 30% of a concentrate comprising:

a mixture of at least three surfactants constituted respectively by a salt of an alkylsulphuric acid wherein the alkyl radical has from 6 to 22 carbon atoms, a salt of an alkylaryl sulphonic acid having a mean molecular weight within the range of 300 to 600, and a salt of a derivative of a carboxylic acid selected from the group consisting of a sulphosuccinic acid derivative corresponding to the general formula:

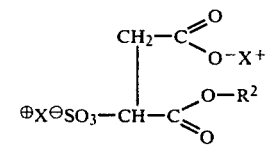

wherein $R^2$ is a saturated or unsaturated hydrocarbon radical having from 4 to 22 carbon atoms, and $X^+$ is selected from the group consisting of lithium, sodium, potassium and ammonium ions, and of a sulphosuccinamic acid derivative corresponding to the general formula:

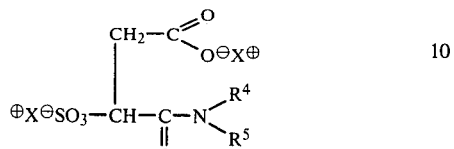

wherein $R^4$ and $R^5$ are each an H radical or a hydrocarbon radical which is saturated or unsaturated, and has from 4 to 22 carbon atoms, $R^4$ and $R^5$ being different when $R^4$ or $R^5$ is an H radical, and $X^+$ is selected from the group consisting of lithium, sodium, potassium and ammonium ions, the weight percentage of each surfactant aforesaid in said mixture being within the range of 10 to 80%; and at least one cosurfactant constituted by a compound which is capable of forming hydrogen bonds with water, the weight percentage of the cosurfactant or surfactants in said surfactants mixture being within the range of 5 to 50%, (b) X % of crude petroleum or of at least one petroleum cut;

(c) Y % of water having a monovalent ion salinity within the range of 30 to 80 g/l and a divalent ion salinity within the range of 0 to 15 g/l, X being approximately equal to 2Y.

24. A microemulsion according to claim 23, wherein said microemulsion contains 25% of said concentrate, 50% of oil and 25% of water.

25. A microemulsion according to claim 23, wherein said microemulsion contains crude petroleum and water having physical and chemical characteristics which are substantially identical with those of the deposit.

26. A microemulsion according to claim 23, wherein the salts of an alkylsulphuric acid and of an alkylaryl sulphonic acid are salts of a metal selected from the group comprising sodium, lithium, potassium and ammonium.

27. A microemulsion according to claim 23, wherein said cosurfactant is selected from the group comprising the mono or polyhydroxylated alcohols.

28. A microemulsion according to claim 23, wherein the weight percentage of each surfactant aforesaid in said mixture is within the range of 10 to 60%.

29. A microemulsion for assisted petroleum recovery from a deposit in which the water has high salinity, wherein said microemulsion contains by weight:

(a) 10 to 30% of a concentrate comprising:
a mixture of at least three surfactants constituted respectively by a salt of an alkylsulphuric acid wherein the alkyl radical has from 6 to 22 carbon atoms, a salt of an alkylaryl sulphonic acid having a mean molecular weight within the range of 300 to 600, and a salt of a derivative of a carboxylic acid selected from the group consisting of a sulphosuccinic acid derivative corresponding to the general formula:

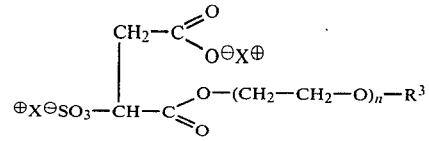

wherein the radical $R^3$ is a saturated or unsaturated hydrocarbon radical having from 4 to 22 carbon atoms n is a whole number between 0 and 20 and $X^+$ is selected from the group consisting of lithium, sodium, potassium and ammonium ions, and of a sulphosuccinamic acid derivative corresponding to the general formula:

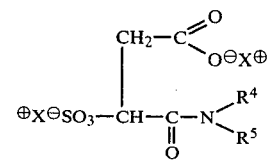

wherein $R^4$ and $R^5$ are each an H radical or a hydrocarbon radical which is saturated or unsaturated, and has from 4 to 22 carbon atoms, $R^4$ and $R^5$ being different when $R^4$ or $R^5$ is an H radical, and $X^+$ is selected from the group consisting of lithium, sodium, potassium and ammonium ions, the weight percentage of each surfactant aforesaid in said mixture being within the range of 10 to 80%; and at least one cosurfactant constituted by a compound which is capable of forming hydrogen bonds with water, the weight percentage of the cosurfactant or cosurfactants in said surfactants mixture being within the range of 5 to 50%, (b) X% of crude petroleum or of at least one petroleum cut;

(c) Y% of water having a monovalent ion salinity within the range of 30 to 80 g/l and a divalent ion salinity within the range of 0 to 15 g/l, X being approximately equal to 2Y.

30. A microemulsion according to claim 29 wherein said microemulsion contains 25% of said concentrate, 50% of oil and 25% of water.

31. A microemulsion according to claim 29, wherein said microemulsion contains crude petroleum and water having physical and chemical characteristics which are substantially identical with those of the deposit.

32. A microemulsion according to claim 29, wherein the salts of an alkylsulphuric acid and of an alkylaryl sulphonic acid are salts of a metal selected from the group consisting of sodium, lithium, potassium and ammonium.

33. A microemulsion according to claim 29, wherein said cosurfactant is selected from the group consisting of mono or polyhydroxylated alcohols.

34. A microemulsion according to claim 29, wherein the weight percentage of each surfactant aforesaid in said mixture is within the range of 10 to 60%.

35. A microemulsion according to claim 29, wherein said microemulsion comprises:

(a) 25% of a concentrate containing:
a salt of an alkylsulphuric acid in which the alkyl radical has from 6 to 22 carbon atoms, an alkylsulphosuccinate corresponding to the formula:

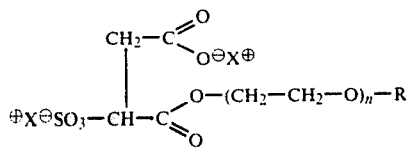

where the R radical is a saturated or unsaturated hydrocarbon radical having from 4 to 22 carbon atoms, n is a whole number between 0 and 20 and $X^\oplus$ is selected from the group consisting of lithium, sodium, potassium and ammonium ions, alkylaryl sulphonates having a mean molecular weight within the range of 300 to 600 and a monohydroxylated alcohol;
(b) 50% of crude petroleum or of a petroleum cut;
(c) 25% of water having a monovalent ion salinity within the range of 50 to 60 g/l and a divalent ion salinity within the range of 5 to 10 g/l.

36. A microemulsion for assisted petroleum recovery from a deposit in which the water has high salinity, wherein said microemulsion contains by weight:
(a) 10 to 30% of a concentrate comprising:
a mixture of at least three surfactants constituted respectively by a salt of an alkylsulphuric acid wherein the alkyl radical has from 6 to 22 carbon atoms, a salt of an alkylaryl sulphonic acid having a mean molecular weight within the range of 300 to 600, and at least a salt of a derivative of a carboxylic acid selected from the group consisting of disodium nonylphenoxypolyethoxysulphosuccinate, disodium dodecanoxypolyethoxy sulphosuccinate, each having between 0 and 20 ethoxy groups, and tetrasodium N(1,2 dicarboxyethyl)-N-octadecylsulphosuccinamate, the weight percentage of each surfactant aforesaid in said mixture being within the range of 10 to 80%; and
at least one cosurfactant constituted by a compound which is capable of forming hydrogen bonds with water, the weight percentage of the cosurfactant or cosurfactants in said surfactants mixture being within the range of 5 to 50%;
(b) X% of crude petroleum or of at least one petroleum cut;
(c) Y% of water having a monovalent ion salinity within the range of 30 to 80 g/l and a divalent ion salinity within the range of 0 to 15 g/l, X being approximately equal to 2Y.

37. A microemulsion according to claim 36, wherein said microemulsion comprises:
25% of a concentrate containing lauryl sodium sulphate, disodium nonylphenoxypolyethoxysulphosuccinate having between 0 and 20 ethoxy groups, alkylaryl sulphonates and isopropanol;
50% of crude petroleum or of a petroleum cut;
25% of water having a monovalent ion salinity of about 57 g/l and a divalent ion salinity of about 9.7 g/l.

38. A microemulsion according to claim 36, wherein said microemulsion contains 25% of said concentrate, 50% of oil and 25% of water.

39. A microemulsion according to claim 36, wherein said microemulsion contains crude petroleum and water having physical and chemical characteristics which are substantially identical with those of the deposit.

40. A microemulsion according to claim 36, wherein the salts of an alkylsulphuric acid and of an alkylaryl sulphonic acid are salts of a metal selected from the group consisting of sodium, lithium, potassium and ammonium.

41. A microemulsion according to claim 36 wherein said cosurfactant is selected from the group consisting of mono or polyhydroxylated alcohols.

42. A microemulsion according to claim 36, wherein the weight percentage of each surfactant aforesaid in said mixture is within the range of 10 to 60%.

* * * * *